H. F. FULLER.
TOOL BOX FOR AUTOMOBILES.
APPLICATION FILED NOV. 20, 1919.
1,412,680.
Patented Apr. 11, 1922.
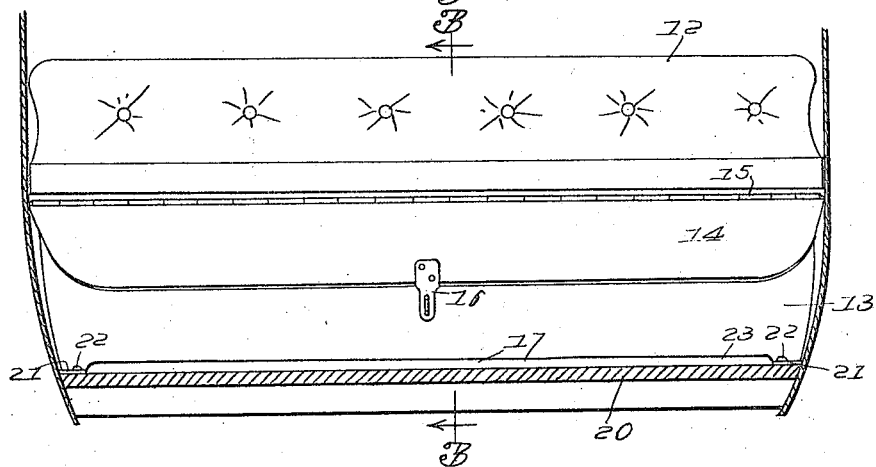
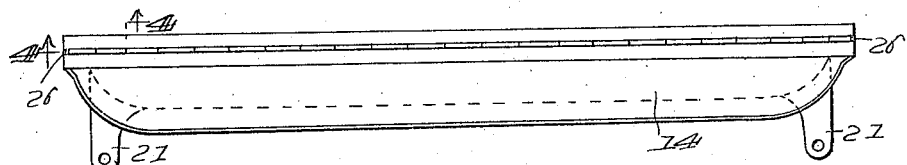
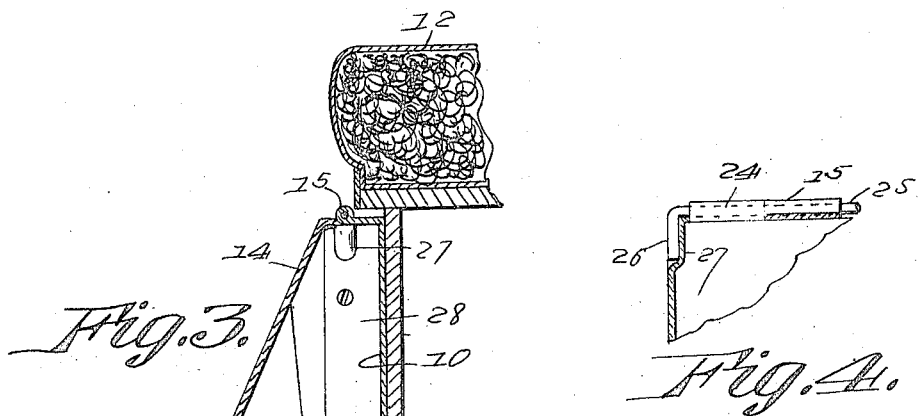
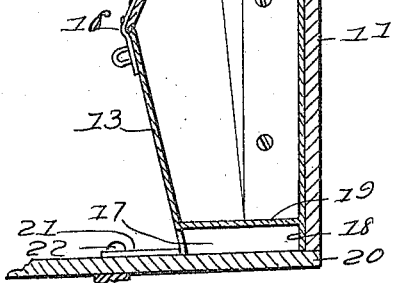

UNITED STATES PATENT OFFICE.

HARDICK F. FULLER, OF KENNEWICK, WASHINGTON.

TOOL BOX FOR AUTOMOBILES.

1,412,680. Specification of Letters Patent. Patented Apr. 11, 1922.

Application filed November 20, 1919. Serial No. 339,257.

*To all whom it may concern:*

Be it known that HARDICK F. FULLER, a citizen of the United States of America, residing at Kennewick, in the county of Benton and State of Washington, has invented new and useful Improvements in Tool Boxes for Automobiles, of which the following is a specification.

The object of the invention is to provide a tool box for use in connection with automobiles and similar vehicles which may be arranged in a convenient position for access by the operator or driver of the car while being inconspicuous and unobstructive as far as the space within the car is concerned, to the end that it may occupy space unavailable for other purposes and may not interfere with the foot room of the operator of the car in controlling the pedals and other devices incidental to the operation of the mechanism.

With these objects in view the invention consists in a construction and combination of parts of which a preferred embodiment is shown in the accompanying drawing, wherein:

Figure 1 is a front elevation of the tool box showing adjacent portions of the car body in cross section.

Figure 2 is a plan view of the same.

Figure 3 is a vertical section on the plane indicated by the line 3—3 of Figure 1.

Figure 4 is a detail section on the plane indicated by the line 4—4 of Figure 2.

The tool box consists of a casing having a rear wall 10 adapted for arrangement in contact with the front riser 11 of the driver's seat indicated at 12, and upwardly and forwardly inclined front walls 13 and an upwardly and rearwardly inclined lid or closure 14 hinged as at 15 to a horizontal forward extension of the rear wall and provided at its free edge with a suitable locking device 16. The front and rear walls of the case or box are extended as at 17 and 18 below the bottom 19 to bear at their edges upon the floor board 20 of the car, the flange or extension 17 being provided with ears 21 secured as by bolts 22 or the equivalents thereof to the frame of the car, and being cut away or slotted as at 23 between said ears and below the plane of the bottom 19, to receive the rear edge of a mat or pad ordinarily arranged upon the floor of the car.

It will be noted that the box in vertical section is reduced towards its top and bottom so as to avoid interference with the movement of the feet of the operator or occupant of the seat and at the same time afford no obstacle to the removal of the rear floor section of the car which ordinarily must be displaced in order to give access to the transmission gear or other mechanism located beneath the same, and yet owing to the fact that the upper portion of the front wall of the box constitutes the lid or closure, the contents are within easy reach of the operator or mechanic when the mechanism requires attention, said contents also being accessible even while the operator is occupying the driver's seat.

In the construction illustrated the hinge by which the lid or closure is connected with the body portion of the box consists of registering eyes or sleeves 24 formed upon the upper edge of said lid or closure and the forwardly extending flange at the upper edge of the rear wall, engaged by a hinge pin 25 of which the extremities 26 are turned down and fitted in seats 27 formed in the end walls 28 of the box.

What is claimed is:

A tool box for automobiles having a casing provided with a vertical rear wall and an upwardly and forwardly inclined front wall, and a lid or closure hingedly mounted at its upper edge upon the rear wall and inclining forwardly and downwardly to the upper edge of the front wall, said front and rear walls being extended below the bottom of the casing to form supporting flanges, and the front supporting flange being provided with feet for attachment to the frame of the automobile and an intermediate cutaway portion or slot for the reception of the rear edge of a floor mat.

In testimony whereof he affixes his signature.

HARDICK F. FULLER.